US012731491B2

(12) United States Patent
Lei et al.

(10) Patent No.: US 12,731,491 B2
(45) Date of Patent: Sep. 8, 2026

(54) SYSTEMS AND METHODS FOR COMMUNICATION BETWEEN INFRASTRUCTURE, VEHICLES, AND USER DEVICES

(71) Applicant: Ford Global Technologies, LLC, Dearborn, MI (US)

(72) Inventors: Oliver Lei, Windsor (CA); Mahmoud Yousef Ghannam, Canton, MI (US); Somak Datta Gupta, Novi, MI (US)

( * ) Notice: Subject to any disclaimer, the term of this patent is extended or adjusted under 35 U.S.C. 154(b) by 234 days.

(21) Appl. No.: 18/508,910

(22) Filed: Nov. 14, 2023

(65) Prior Publication Data

US 2025/0157336 A1 May 15, 2025

(51) Int. Cl.
*G08G 1/16* (2006.01)
*G06V 20/52* (2022.01)
*G06V 40/10* (2022.01)

(52) U.S. Cl.
CPC ............. *G08G 1/166* (2013.01); *G06V 20/52* (2022.01); *G06V 40/10* (2022.01); *G08G 1/164* (2013.01); *G06V 2201/08* (2022.01)

(58) Field of Classification Search
CPC ........ G08G 1/166; G08G 1/164; G08G 1/005; G08G 1/095; G06V 20/52; G06V 40/10; G06V 2201/08; H04W 4/44
See application file for complete search history.

(56) References Cited

U.S. PATENT DOCUMENTS 9,881,503 B1 1/2018 Goldman-Shenhar et al.
10,593,198 B2 3/2020 Benhammou et al.
11,014,555 B1 * 5/2021 Beauchamp .......... H04W 4/023
11,128,999 B2 9/2021 Abari et al.
11,242,051 B1 2/2022 Konrardy et al.
RE49,232 E 10/2022 Strickland et al.
12,100,300 B2 * 9/2024 James .................... G08G 1/164
12,194,992 B2 * 1/2025 Prasad Challa .............................. B60W 30/18109
12,286,106 B2 * 4/2025 Kario .............. B60W 30/18145
2018/0262865 A1 * 9/2018 Lepp ...................... G08G 1/166
2019/0088115 A1 * 3/2019 Tanabe ................... G08G 1/164
(Continued)

OTHER PUBLICATIONS

Boris Bučko, et al., Smart Mobility and Aspects of Vehicle-To-Infrastructure: A Data Viewpoint, Applied Sciences 2021, 11, 10514. https://doi.org/10.3390/app112210514, Nov. 9, 2021, pp. 1-18.

*Primary Examiner* — Ig T An
(74) *Attorney, Agent, or Firm* — Frank Lollo; Eversheds Sutherland (US) LLP

(57) ABSTRACT

A trail crossing system is disclosed. The system may include a detection unit and a processor. The detection unit may be configured to detect a presence of a vehicle and a person in proximity to an intersection point on a road network. The processor may be configured to obtain inputs from the detection unit. Responsive to obtaining the inputs, the processor may be configured to determine that a predetermined condition is met. The predetermined condition may be met when a distance between the vehicle and the intersection point and a distance between the person and the intersection point are less than respective threshold values. The processor may be further configured to output a notification to at least one of a user device associated with the person and the vehicle responsive to a determination that the predetermined condition is met.

20 Claims, 5 Drawing Sheets

(56) References Cited

U.S. PATENT DOCUMENTS

| | | | | |
|---|---|---|---|---|
| 2021/0065551 | A1* | 3/2021 | Manohar | B60Q 9/008 |
| 2023/0222915 | A1* | 7/2023 | Girard | G08G 1/164 |
| | | | | 701/301 |

* cited by examiner

SYSTEMS AND METHODS FOR COMMUNICATION BETWEEN INFRASTRUCTURE, VEHICLES, AND USER DEVICES

FIELD

The present disclosure relates to systems and methods for communication between infrastructure, vehicles, and user devices on road networks.

BACKGROUND

A trail is an unpaved or a small paved road which is normally used by people for walking, running, and biking. In some scenarios, the trail may cross a road with vehicle traffic. In such cases, the trail generally includes a stop sign to remind people to check the traffic on the road before crossing the road.

Even though people typically check the traffic in both directions before crossing the road, there are known instances of adverse situations on such trails. One of the reasons for such situations is that the person may not be able to check the traffic in both the directions simultaneously. Additionally, in some cases, there may exist a scenario in which a nearby vehicle on the road may not be in a field-of-view of the person or may be obstructed due to the structure of the road network or traffic light.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
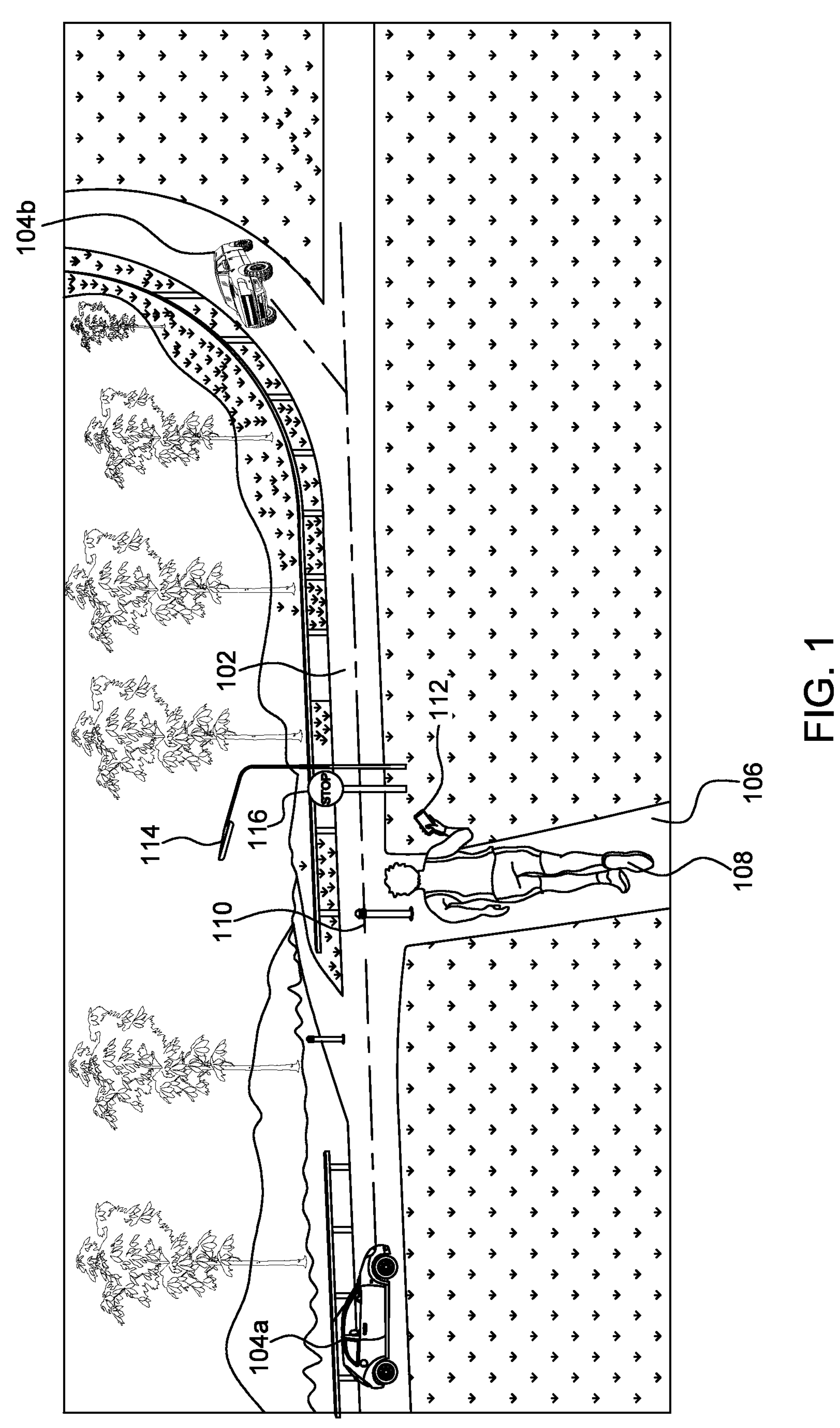
FIG. 1 depicts an environment in which techniques and structures for providing the systems and methods disclosed herein may be implemented.

The present disclosure describes systems and methods for communication between infrastructure, vehicles, and user devices on road network to facilitate a user (e.g., walker, runner, or biker) to conveniently cross a road. The system may determine a presence of the person and the vehicle in proximity to an intersection point (at which a trail crosses the road network), and may output a visual/audible notification to the person and/or the vehicle via a network. The notification may indicate to the person and the vehicle about each other's presence in proximity to the intersection point, thereby enabling the person and the vehicle to prevent any adverse situation. In some aspects, the system may be part of the infrastructure disposed in proximity to the intersection point. In addition or alternatively, the system may be part of the vehicle and/or a user device associated with the person.

When the system is part of the infrastructure, the system may detect the presence of the person and the vehicle in proximity to the intersection point via, e.g., camera(s) disposed at the infrastructure. Responsive to such detection, the system may output an audible notification to the user device to indicate that the vehicle may be approaching the intersection point. In some aspects, the system may activate lights associated with the infrastructure (e.g., activate lights associated with stop signboard, lamppost(s), etc. in a predetermined pattern). In addition or alternatively, the system may output a notification to the vehicle (e.g., to a vehicle Human-Machine Interface, HMI) to indicate that the person may be approaching the intersection point.

When the system is part of the vehicle, the system may detect the presence of the person and the intersection point via, e.g., vehicle front camera, thermal camera, and/or other vehicle sensors. Responsive to such detection, the system may output a notification to the infrastructure and/or the user device located in proximity to the intersection point, so that the infrastructure and/or the user device may take remedial actions. For example, the infrastructure may flash lights associated with the lamppost(s), responsive to receiving the notification from the system. In additional aspects, the vehicle may activate one or more components (such as external vehicle lights/speakers) in a predetermined manner to provide an indication to the person that the vehicle may be approaching the intersection point. In further aspects, the system may cause the vehicle to automatically slow down when the system detects the person presence in proximity to the intersection point.

When the system is part of the user device, the system may detect that the person may be approaching the intersection point based on a real-time user device location. Responsive to such detection, the user device may output notification to the infrastructure and/or the vehicle to indicate that the person may be approaching the intersection point. The infrastructure and/or the vehicle may receive the notification and may perform remedial actions, as described above.

The present disclosure discloses a system for facilitating the person to conveniently cross the road while minimizing a probability of any adverse situation. In addition, the system facilitates the infrastructure to provide notifications to the user device and the vehicle located in proximity to the infrastructure, so that the person and/or the vehicle may perform timely remedial actions.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a road network 102 on which one or more vehicles 104*a*, 104*b* (collectively referred to as a vehicle 104) may be travelling. The vehicle 104 may take the form of any passenger or commercial vehicle such as, for example, a car, a work vehicle, a crossover vehicle, a truck, a van, a minivan, a taxi, a bus, a motorcycle, a train etc. Further, the vehicle 104 may be a manually driven vehicle and/or may be configured to operate in a fully autonomous (e.g., driverless) mode or a partially autonomous mode and may include any powertrain such as, for example, a gasoline engine, one or more electrically-actuated motor(s), a hybrid system, etc.

The environment 100 may further include a trail 106 that may be an unpaved or a small paved road. A person 108 may use the trail 106 for walking, running, etc. In some aspects, the person 108 may include a handicap rider, such as in a wheelchair or modified vehicle and/or the like. In some aspects, the trail 106 may cross or connect with the road network 102 via an intersection point 110. Stated another way, the intersection point 110 may be a point on the road network 102 at which the trail 106 meets the road network 102. In other aspects, the intersection point 110 may be any junction point on the road network 102.

In some aspects, the intersection point 110 may include infrastructure that may include, for example, lamppost(s) 114, signboard(s) 116 (e.g., a stop signboard), and/or the like. In some aspects, the infrastructure may be configured to communicate with a vehicle (such as the vehicle 104) and a user device 112 associated with the person 108 via a network (shown as network 204 in FIG. 2). For example, the infrastructure disposed at the intersection point 110 may communicate with the vehicle 104 and the user device 112 when the vehicle 104 and the user device 112 may be in proximity to the intersection point 110. In addition, the vehicle 104 and the user device 112 may be configured to communicate with each other and with the infrastructure via the network. Stated another way, the vehicle 104, the user device 112 and the infrastructure (e.g., the lamppost 114 and the signboard 116) may communicate with each other via the network. In some aspects, the user device 112 may be, for example, a smartphone, a wearable device such as smartwatch, bracelet, ring, eyeglasses, or any other device having communication capabilities.

The network, through which the units described above communicate with each other, illustrates an example communication infrastructure in which the connected devices discussed in various embodiments of this disclosure may communicate. The network may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In further aspects, the environment 100 may include a notification system or a trail crossing system (shown as trail crossing system 200 in FIG. 2) that may be a part of the vehicle 104, infrastructure (such as the lamppost(s) 114 or signboard(s) 116), or the user device 112, and the combination thereof. The system may be configured to detect a presence of the vehicle 104 and the person 108 in proximity to the intersection point 110 and determine that a predetermined condition may be met based on the detection. Responsive to determining that the predefined condition may be met, the system may transmit one or more notifications to the user device 112 (or the person 108) and/or the vehicle 104. The notification may indicate to the person 108 that the vehicle 104 may be approaching the intersection point 110, and hence, the person 108 should run/walk carefully. Similarly, the notification may indicate to a vehicle operator/vehicle 104 that the person 108 may be approaching the intersection point 110, and hence, the vehicle 104 should travel carefully. If the vehicle 104 is a manually driven vehicle, the vehicle operator may hear/view the notification and may accordingly maneuver the vehicle movement. If the vehicle 104 is an autonomous vehicle, the vehicle 104 may itself maneuver its movement responsive to receiving the notification from the system.

In an exemplary aspect, the system may determine that the predetermined condition may be met when a distance between the vehicle 104 and the intersection point 110 may be less than a first predefined threshold value (e.g., 15-50 meters) and a distance between the person 108 and the intersection point 110 may be less than a second predefined threshold value (e.g., 5-20 meters). The system may output the notification to the user device 112, the person 108 (e.g., via the lamppost(s) 114 or signboard(s) 116) and/or the vehicle 104 when the condition described above may be met.

In a scenario where the system is part of the infrastructure, the infrastructure may detect the presence of the vehicle 104 and the person 108 in proximity to the intersection point 110. In this case, the infrastructure may include a camera that may be configured to capture intersection point images in real-time. In some aspects, the camera may be disposed in proximity to the intersection point 110 and may be stationary at the intersection point 110, so that the camera may efficiently capture intersection point images. The system may obtain inputs (e.g., images) from the camera installed at the intersection point 110 and may determine that the predetermined condition may be met based on the obtained inputs. Responsive to such determination, the infrastructure may output the notification to the vehicle 104 and/or the user device 112, as described above. In an exemplary aspect, the infrastructure may output an audio notification to the user device 112 via a wireless network such as BLE, and/or an audio/visual notification to the vehicle 104 via a vehicle Human-Machine Interface (HMI) (shown as HMI 214 in FIG. 2). In addition or alternatively, the infrastructure may output a visual notification to the vehicle 104 or the person 108 via the signboard 116 (e.g., by activating lights associated with the signboard 116 in a predetermined pattern).

In a scenario where the system is part of the vehicle 104, the vehicle 104 may detect the intersection point 110 via, e.g., vehicle sensors, cameras, GPS location, and/or the like. In addition, the vehicle 104 may detect the person presence in proximity to the intersection point 110 by using inputs obtained from the vehicle sensors/cameras and/or the camera installed at the intersection point 110 (which may be communicatively coupled with the vehicle 104). Responsive to such detection, the vehicle 104 may output a notification to the infrastructure and/or the user device 112 via the network. In addition or alternatively, the vehicle 104 may perform one or more actions including, but not limited to, activating vehicle exterior speaker and outputting the notification, activating vehicle exterior lights in a predetermined pattern to provide an indication to the person 108 to stop. Further, in this case, the infrastructure and the user device 112 may receive the notification from the vehicle 104 and may provide/display the notification for the person 108. The person 108 may accordingly perform remedial action to prevent an adverse situation. In addition, the vehicle 104 may output a notification to the vehicle HMI requesting the vehicle operator to slow down, or the vehicle 104 may automatically slow down itself if the vehicle 104 is an autonomous vehicle.

In a scenario where the system is part of the user device 112, the user device 112 may determine that the person 108 may be in proximity to the intersection point 110 based on the user device's real-time geolocation and an intersection point geolocation. The user device 112 may further determine that the vehicle 104 may be in proximity to the intersection point 110 based on inputs obtained from the camera installed at the intersection point 110 (that may be communicatively coupled with the user device 112) and/or a vehicle real-time geolocation obtained from the vehicle 104. Responsive to such determination, the user device 112 may output a notification to the infrastructure and/or the vehicle 104 via the network. The infrastructure and the vehicle 104 may receive the notification and may display/output the notification for the person 108 and/or the vehicle operator to take remedial actions.

In some aspects, the system may be located in all the infrastructure, the vehicle 104, and the user device 112. Any above-mentioned device may detect the presence of the vehicle 104 and the person 108 in proximity to the intersection point 110 and may output notification to other devices (the infrastructure, the vehicle 104, and/or the user device 112) based on the detection. The other devices may receive the notification and may display/provide the notification or autonomously perform remedial actions to prevent adverse situation.

Further details of the system are described below in conjunction with FIG. 2.

The vehicle 104, the infrastructure, and the system implement and/or perform operations, as described here in the present disclosure, in accordance with the owner manual and safety guidelines. In addition, any action taken by the person 108 or the vehicle 104 based on messages or notifications provided by the vehicle 104/system/infrastructure should comply with all the rules specific to the location and operation of the vehicle 104 (e.g., Federal, state, country, city, etc.). The messages or notifications, as provided by the vehicle 104, infrastructure, and/or the system should be treated as suggestions and only followed according to any rules specific to the location and operation of the vehicle 104.

Figure 2:
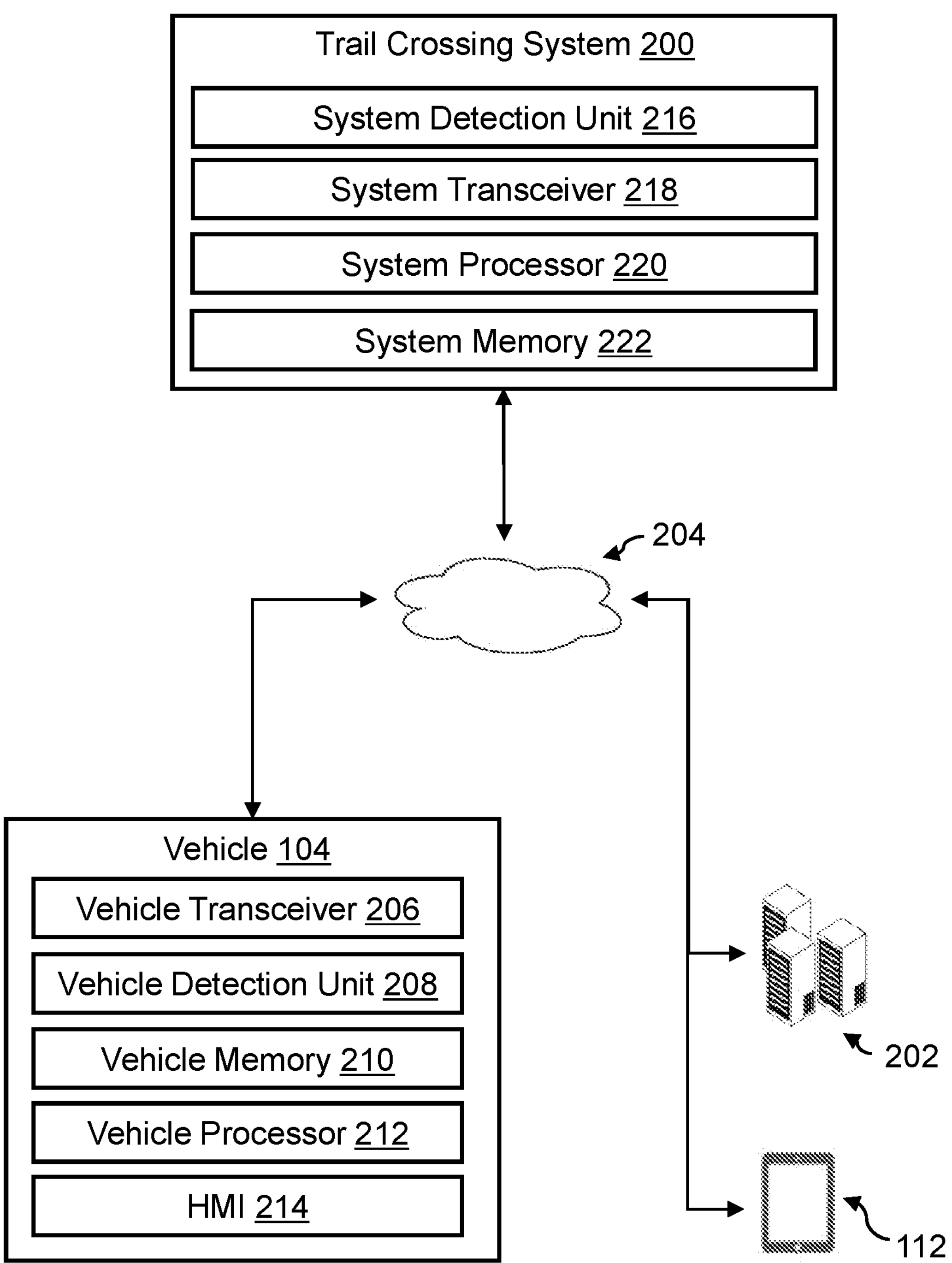
FIG. 2 depicts a block diagram of a trail crossing system in accordance with the present disclosure.

FIG. 2 depicts a block diagram of a trail crossing system 200 (or system 200) in accordance with the present disclosure. FIG. 2 will be described in conjunction with FIGS. 3 and 4. In some aspects, the system 200 may be outside the vehicle 104. For example, the system 200 may be part of the infrastructure and/or the user device 112. In other aspects, the system 200 may be a part of the vehicle 104.

The system 200 may be communicatively coupled with the vehicle 104, the user device 112 and one or more servers 202 (or server 202) via one or more networks 204 (or network 204). The server 202 may be part of a cloud-based computing infrastructure and may be associated with and/or include a Telematics Service Delivery Network (SDN) that provides digital data services to the vehicle 104, the infrastructure, and/or the user device 112. In some aspects, the server 202 may be configured to store information associated with the intersection point 110 (e.g., an intersection point geolocation), a road network map, a geographical area map, images captured by the camera associated with the infrastructure, and/or the like. The server 202 may be configured to transmit the information described above to the vehicle 104/system 200 at a predefined frequency, or when the vehicle 104/system 200 transmits a request to the server 202 to obtain the information.

The vehicle 104 may include a plurality of units including, but not limited to, a vehicle transceiver 206, a vehicle detection unit 208, a vehicle memory 210, a vehicle processor 212 and a vehicle Human-Machine Interface 214 (HMI 214), which may be communicatively coupled with each other. The vehicle detection unit 208 may include vehicle cameras, ultrasonic sensors, Radio Detection and Ranging (radar) sensors, Light Detection and Ranging (lidar) sensors, thermal camera, and/or the like. The vehicle detection unit 208 may be configured to capture images of the intersection point 110 (and the person 108) in proximity to the vehicle 104. In addition, the vehicle detection unit 208 may be configured to detect an intersection point presence on the road network 102.

The HMI 214 may be configured to receive user inputs to control vehicle operation and/or user requests to control system operation. In addition, the HMI 214 may be configured to output one or more notifications to the vehicle operator based on inputs obtained from the vehicle detection unit 208 (and/or other components or devices such as the system 200, infrastructure, user device 112, and/or the like).

The vehicle transceiver 206 may be configured to transmit/receive signals/information/data to/from external systems and devices via the network 204. For example, the vehicle transceiver 206 may transmit information/signals/data obtained from the vehicle detection unit 208 to the system 200 via the network 204. As another example, the vehicle transceiver 206 may receive one or more notifications from the system 200 (and/or the other devices) via the network 204 and transmit the notifications to the HMI 214.

The vehicle processor 212 may be disposed in communication with one or more memory devices disposed in communication with the respective computing systems (e.g., the vehicle memory 210 and/or one or more external databases not shown in FIG. 2). The vehicle processor 212 may utilize the vehicle memory 210 to store programs in code and/or to store data for performing aspects in accordance with the disclosure. The vehicle memory 210 may be a non-transitory computer-readable storage medium or memory storing a program code that enables the vehicle processor 212 to perform operations in accordance with the present disclosure. The vehicle memory 210 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The system 200 may include a system detection unit 216, a system transceiver 218, a system processor 220, and a system memory 222, which may be communicatively coupled with each other. The system transceiver 218 may be configured to transmit/receive signals/information/data to/from systems and devices including the vehicle 104 (e.g., via the vehicle transceiver 206), the user device 112, the server 202, the lamppost 114, the signboard 116, and/or the like, via the network 204.

The system detection unit 216 may be configured to detect the presence of the vehicle 104 and the person 108 in proximity to the intersection point 110 on the road network 102. In some aspects, the system detection unit 216 may include one or more cameras (or any other sensor device) that may be configured to capture images of the person 108, the vehicle 104 located in proximity to the intersection point 110, and/or a geographical area where the intersection point 110 may be located.

The system processor 220 may be disposed in communication with one or more memory devices disposed in communication with the respective computing systems (e.g., the system memory 222 and/or one or more external databases not shown in FIG. 2). The system processor 220 may utilize the system memory 222 to store programs in code and/or to store data for performing aspects in accordance with the disclosure. The system memory 222 may be a non-transitory computer-readable storage medium or memory storing a program code that enables the system processor 220 to perform operations in accordance with the present disclosure. The system memory 222 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In operation, the system transceiver 218 may receive inputs from the system detection unit 216 and may transmit the inputs to the system memory 222 for storage purpose. In addition or alternatively, the system transceiver 218 may transmit the inputs to the system processor 220. The system processor 220 may obtain the inputs from the system transceiver 218 directly or from the system memory 222. Responsive to obtaining the inputs, the system processor 220 may determine whether a predetermined condition may be met. For example, the system processor 220 may determine whether a distance between the vehicle 104 and the intersection point 110 may be less than the first predefined threshold value and a distance between the person 108 (or the user device 112) may be less than the second predefined threshold value. The system processor 220 may determine that the predetermined condition may be met when the distance between the vehicle 104 and the intersection point 110 is less than the first predefined threshold value and the distance between the person 108 (or the user device 112) is less than the second predefined threshold value. Responsive to a determination that the predetermined condition is met, the system processor 220 may output a notification to the user device 112, person 108 (e.g., via the lamppost(s) 114 or signboard(s) 116), and/or to the vehicle 104, via the system transceiver 218 and the network 204.

As described above, in some aspects, the system 200 may be part of the infrastructure, the user device 112, or the vehicle 104. The operation of the system 200 is described below in detail for different scenarios.

In a first scenario, the system 200 may be part of the infrastructure (including the lamppost(s) 114 and the signboard 116) disposed at the intersection point 110. In such a scenario, the system detection unit 216 may be a camera (not shown) that may be disposed at the infrastructure. The camera may be configured to capture images of the person 108 and the vehicle 104 located in proximity to the intersection point 110 (e.g., in a camera field of view). The system detection unit 216 may transmit the captured images to the system processor 220 (e.g., via the system transceiver 218). The system processor 220 may obtain the images, determine that the predetermined condition described above may be met based on the obtained images, and output the notification to the vehicle 104 and/or the person 108 (or the user device 112) responsive to determining that the predetermined condition may be met.

Figure 3:
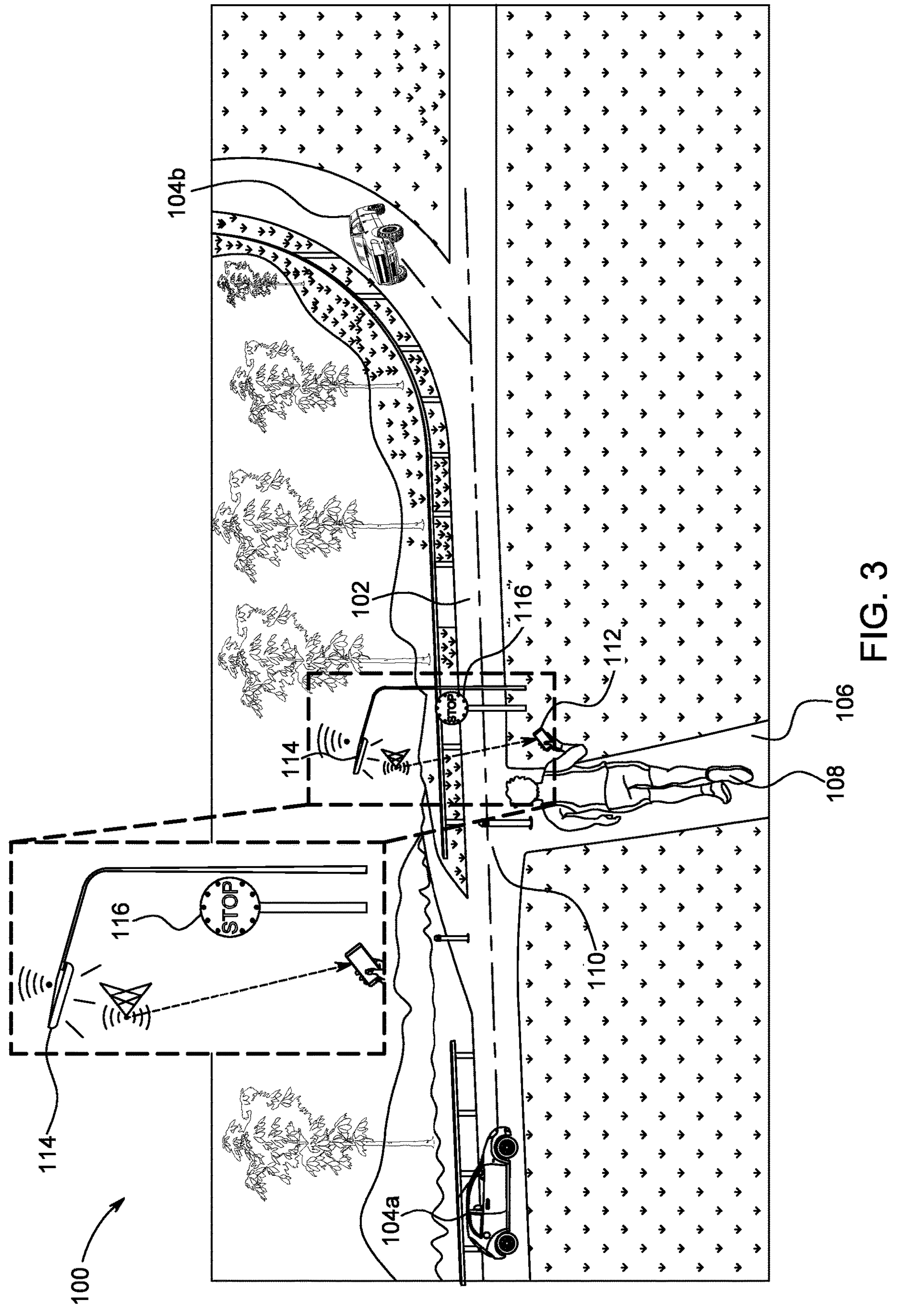
FIG. 3 depicts a snapshot of a notification being provided to a person in accordance with the present disclosure.

In some aspects, the system processor 220 may output the notification to the person 108 by transmitting an audio signal/notification to the user device 112 via the network 204 (as shown in FIG. 3). In further aspects, the system processor 220 may output the notification to the person 108 by outputting a first visual signal/notification via the infrastructure. For example, in the first visual signal/notification, the system processor 220 may activate lights associated with a first lamppost (e.g., the lamppost 114) and/or a first signboard (e.g., the signboard 116) disposed at the intersection point 110. In some aspects, to output the first visual signal/notification, the system processor 220 may transmit a command signal to the first lamppost and/or the first signboard to active the lights in a first predetermined manner. In some aspects, the first lamppost and the first signboard may be disposed at a position in proximity to the intersection point 110 that faces the person 108. Responsive to outputting the first visual signal/notification, the person 108 may receive/view the signal/notification and may perform remedial action to prevent any adverse situation due to the vehicle presence in proximity to the intersection point 110.

In some aspects, the system processor 220 may output the notification to the vehicle 104 (e.g., via the vehicle transceiver 206 and the network 204) by transmitting an audio notification signal or a visual notification to the HMI 214. In further aspects, the system processor 220 may output the notification to the vehicle 104 by outputting a second visual signal/notification via the infrastructure. For example, in the second visual signal/notification, the system processor 220 may activate lights of a second lamppost and/or a second signboard disposed at the intersection point 110. In some aspects, to output the second visual signal/notification, the system processor 220 may transmit a command signal to the second lamppost and/or the second signboard to activate the lights in a second predetermined manner (that may be same as or different from the first predetermined manner). In some aspects, the second lamppost and the second signboard may be disposed at a position at the intersection point 110 that faces the vehicle 104. The vehicle operator and/or the vehicle 104 may receive/view the signal/notification and may accordingly maneuver vehicle movement. For example, the vehicle 104 may reduce its speed automatically (via the vehicle processor 212) responsive to receiving the signal/notification from the system processor 220, when the vehicle 104 may be an autonomous vehicle. Alternatively, the vehicle operator may reduce the vehicle speed responsive to viewing/hearing the notification, when the vehicle 104 may be a manually driven vehicle.

In a second scenario, the system 200 may be part of the vehicle 104. In such a scenario, the system detection unit 216 may be same as the vehicle detection unit 208, the system processor 220 may be same as the vehicle processor 212, and the system transceiver 218 may be same as the vehicle transceiver 206. In this case, the system detection unit 216 may include a vehicle front camera, a thermal camera, a radar sensor, a lidar sensor, ultrasonic sensors, and/or the like. In some aspects, the system detection unit 216 may capture person images in proximity to the intersection point 110 when the vehicle 104 may be within a predefined distance from the intersection point 110. The system detection unit 216 may be further configured to detect that the intersection point 110 may be ahead of the vehicle 104 in a vehicle's movement direction (or the vehicle 104 may be approaching the intersection point 110). In further aspects, the vehicle 104 may be configured to obtain a real-time vehicle location using Global Positioning System (GPS) and detect that the intersection point 110 may be ahead of the vehicle 104 based on the real-time vehicle location and a geographical area map (stored on the vehicle memory 210 or the server 202) associated with a geographical area where the intersection point 110 may be located, and.

Figure 4:
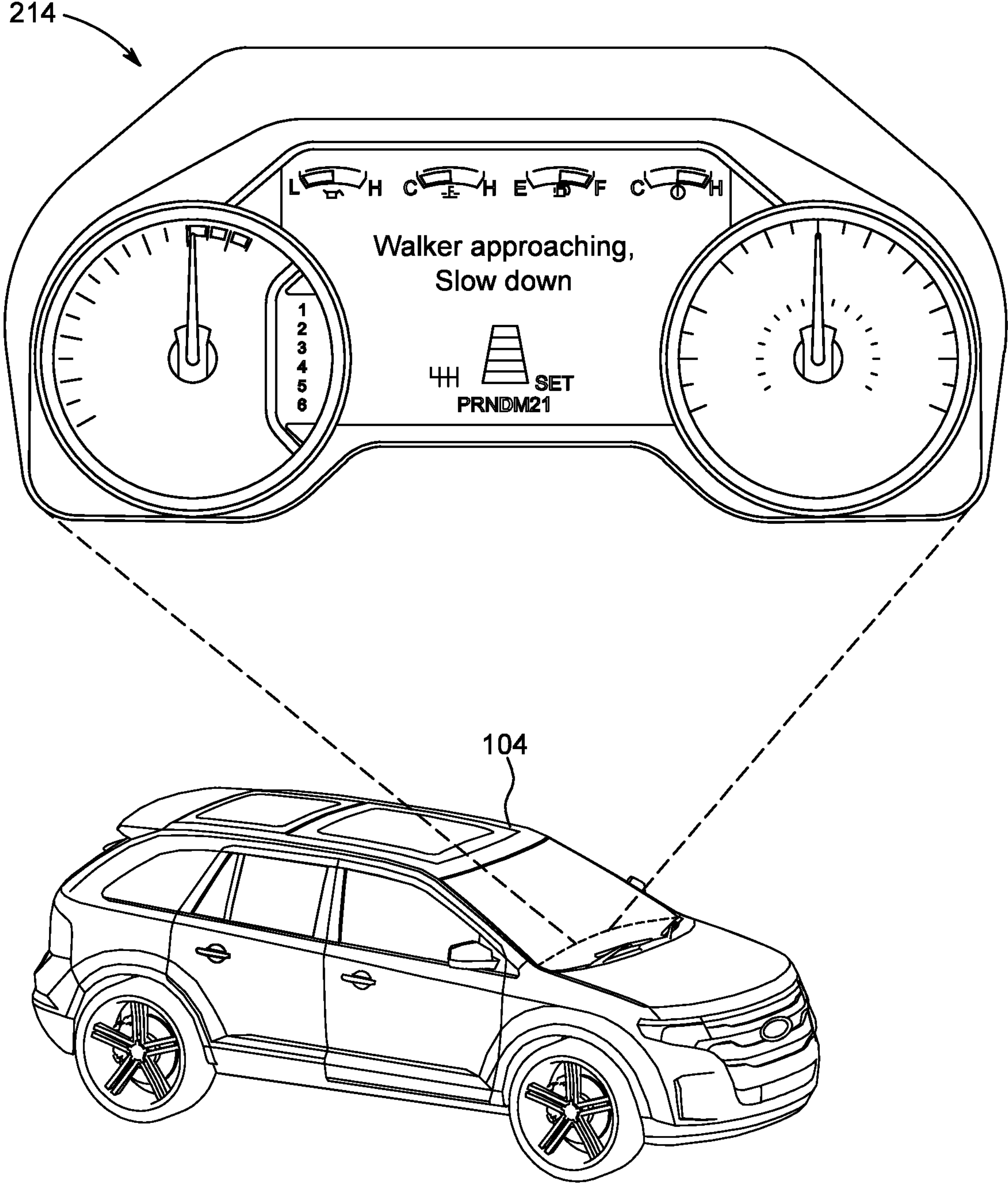
FIG. 4 depicts a snapshot of a notification being displayed on a vehicle Human-Machine Interface (HMI) in accordance with the present disclosure.

The system processor 220 may be configured to obtain the inputs from the system detection unit 216 and determine whether the predetermined condition described above may be met based on the obtained inputs. Responsive to a determination that the predetermined condition may be met, the system processor 220 may output (via the system transceiver 218) a notification to the infrastructure and/or the user device 112, indicating that the vehicle 104 may be approaching the intersection point 110. The infrastructure may receive the notification from the system processor 220 and may output a notification to the person 108. As an example, the infrastructure may output an audible or visual notification to the person 108 (or the user device 112) in the manner described above. In further aspects, the system processor 220 may output a notification to the HMI 214 (as shown in FIG. 4) to indicate that the person 108 may be approaching the intersection point 110 or may be in proximity to the intersection point 110, and hence, the vehicle 104 should slow down (as shown in FIG. 4). In further aspects, the vehicle 104 may perform one or more additional actions including, but not limited to, activating vehicle exterior speakers and outputting the notification as audible signal, activating exterior lights in a predetermined pattern, and/or the like, to provide an indication to the person 108 to stop or to walk carefully.

In a third scenario, the system 200 may be a part of the user device 112. In such a scenario, the system detection unit 216 may detect a user device real-time location (e.g., by using GPS) to determine the user device presence in proximity to the intersection point 110 (e.g., by using the geographical area map stored in the system memory 222 or the server 202). The system processor 220 may obtain inputs from the system detection unit 216 and may determine whether the predetermined condition described above may be met. Responsive to a determination that the predetermined condition may be met, the system processor 220 may output a notification to the infrastructure and/or the vehicle 104 via the network 204. The infrastructure and/or the vehicle 104 may receive the notification and may display/output the notification, in the manner described above.

Figure 5:
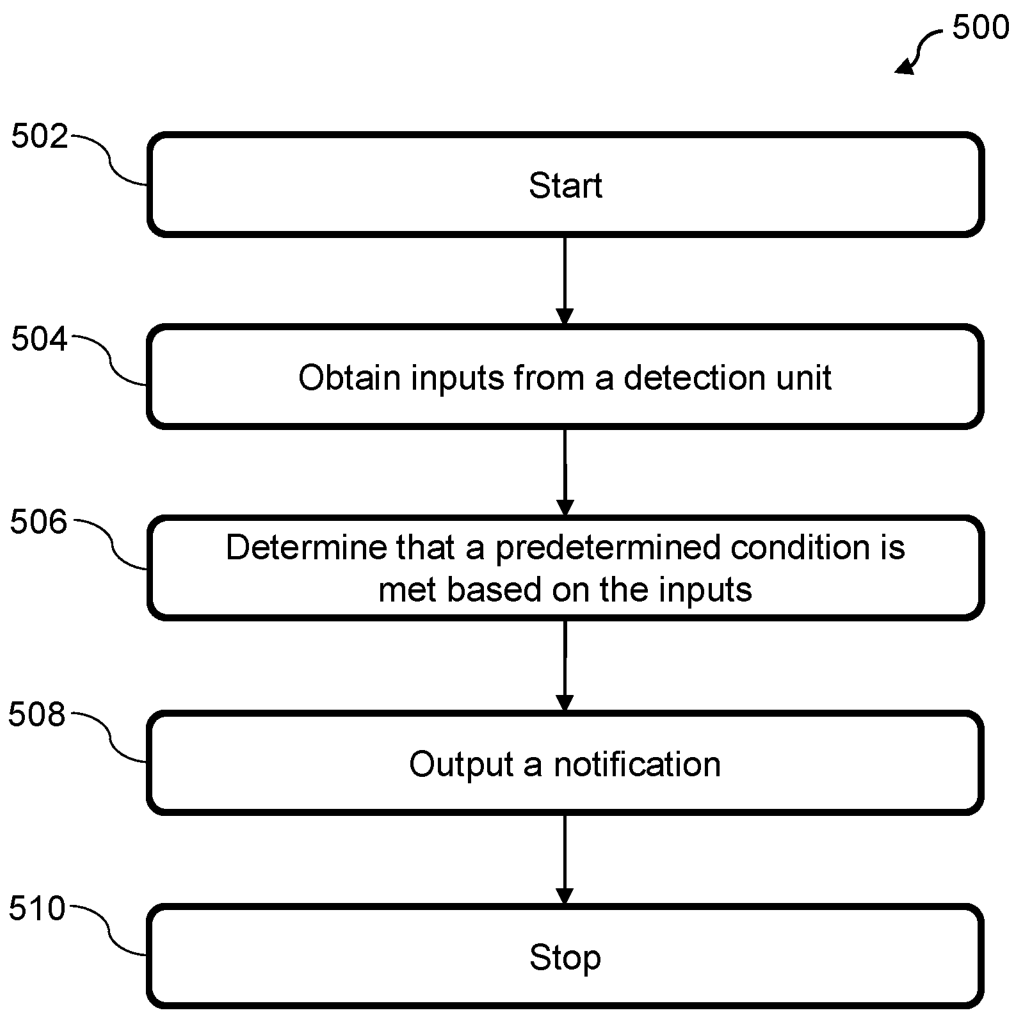
FIG. 5 depicts a flow diagram of a notification method in accordance with the present disclosure.

FIG. 5 depicts a flow diagram of an example notification method 500 in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the system processor 220, the inputs from the system detection unit 216. At step 506, the method 500 may include determining, by the system processor 220, that a predetermined condition may be met based on the inputs. As described above, the predetermined condition may be met when a distance between the vehicle 104 and the intersection point 110 and the distance between the person 108 and the intersection point 110 may be less than respective threshold values (e.g., 20 meters for the vehicle 104 and 5 meters for the person 108).

At step 508, the method 500 may include outputting, by the system processor 220, a notification to the user device 112 associated with the person 108 and/or the vehicle 104, responsive to a determination that the predetermined condition may be met.

At step 510, the method 500 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
- a fixed detection unit configured to concurrently detect a presence of a vehicle and a person in proximity to an intersection point on a road network, the fixed detection unit located at the intersection point; and
- a processor communicatively coupled to the detection unit, wherein the processor is configured to:
  - obtain inputs from the fixed detection unit;
  - determine that a predetermined condition is met based on the inputs, wherein the predetermined condition is met when a first distance between the vehicle and the intersection point is less than a first predefined threshold value and a second distance between the person and the intersection point is less than a second predefined threshold value, wherein the first predefined threshold value is larger than the second predefined threshold value; and
  - output a notification to at least one of a user device associated with the person and the vehicle responsive to a determination that the predetermined condition is met.

2. The system of claim 1, wherein the processor outputs the notification by outputting an audio signal to the user device.

3. The system of claim 1, wherein the processor outputs the notification to the vehicle by outputting a visual signal or an audio signal to a vehicle Human-Machine Interface (HMI).

4. The system of claim 1, wherein the processor is further configured to output a first visual signal to the person via a first signboard disposed at the intersection point, and wherein the first signboard is disposed at a position that faces the person.

5. The system of claim 4, wherein the processor is further configured to output a second visual signal to the vehicle via a second signboard disposed at the intersection point, and wherein the second signboard is disposed at a position that faces the vehicle.

6. The system of claim 5, wherein the processor outputs the first visual signal and the second visual signal by activating lights associated with the first signboard and the second signboard in a predetermined pattern.

7. The system of claim 1, wherein the detection unit is disposed in proximity to the intersection point on the road network, and wherein the detection unit is stationary at the intersection point.

8. The system of claim 1, wherein the detection unit comprises a camera.

9. A method comprising:
- obtaining, by a processor, inputs from a fixed detection unit, wherein the detection unit is configured to concurrently detect a presence of a vehicle and a person in proximity to an intersection point on a road network and wherein the fixed detection unit is located at the intersection point;
- determining, by the processor, that a predetermined condition is met based on the inputs, wherein the predetermined condition is met when a first distance between the vehicle and the intersection point is less than a first predefined threshold value and a second distance between the person and the intersection point is less than a second predefined threshold value, wherein the first predefined threshold value is different than the second predefined threshold value; and
- outputting, by the processor, a notification to at least one of a user device associated with the person and the vehicle responsive to a determination that the predetermined condition is met.

10. The method of claim 9, wherein outputting the notification to the user device comprises outputting an audio signal to the user device.

11. The method of claim 9, wherein outputting the notification to the vehicle comprises outputting a visual signal or an audio signal to a vehicle Human-Machine Interface (HMI).

12. The method of claim 9, wherein outputting the notification further comprises outputting a first visual signal to the person via a first signboard disposed at the intersection point, and wherein the first signboard is disposed at a position that faces the person.

13. The method of claim 12, wherein outputting the notification further comprises outputting a second visual signal to the vehicle via a second signboard disposed at the intersection point, and wherein the second signboard is disposed at a position that faces the vehicle.

14. The method of claim 13, wherein outputting the first visual signal and the second visual signal comprises activating lights associated with the first signboard and the second signboard in a predetermined pattern.

15. A non-transitory computer-readable storage medium having instructions stored thereupon which, when executed by a processor, cause the processor to:
- obtain inputs from a fixed detection unit, wherein the fixed detection unit is configured to concurrently detect a presence of a vehicle and a person in proximity to an intersection point on a road network and wherein the fixed detection unit is located at the intersection point;
- determine that a predetermined condition is met based on the inputs, wherein the predetermined condition is met when a first distance between the vehicle and the intersection point is less than a first predefined threshold value and a second distance between the person and the intersection point is less than a second predefined threshold value, wherein the second predefined threshold value is smaller than the first predefined threshold value; and output a notification to at least one of a user device associated with the person and the vehicle responsive to a determination that the predetermined condition is met.

16. The non-transitory computer-readable storage medium of claim 15, wherein outputting the notification to the user device comprises outputting an audio signal to the user device.

17. The non-transitory computer-readable storage medium of claim 15, wherein outputting the notification to the vehicle comprises outputting a visual signal or an audio signal to a vehicle Human-Machine Interface (HMI).

18. The non-transitory computer-readable storage medium of claim 15, wherein outputting the notification further comprises outputting a first visual signal to the person via a first signboard disposed at the intersection point, and wherein the first signboard is disposed at a position that faces the person.

19. The non-transitory computer-readable storage medium of claim 18, wherein outputting the notification further comprises outputting a second visual signal to the vehicle via a second signboard disposed at the intersection point, and wherein the second signboard is disposed at a position that faces the vehicle.

20. The non-transitory computer-readable storage medium of claim 19, wherein outputting the first visual signal and the second visual signal comprises activating lights associated with the first signboard and the second signboard in a predetermined pattern.

* * * * *